M. A. PASCALE.
MILK BOTTLE HOLDER.
APPLICATION FILED MAR. 13, 1920.

1,360,786.

Patented Nov. 30, 1920.

WITNESSES

INVENTOR
M. A. PASCALE,
BY
ATTORNEYS

UNITED STATES PATENT OFFICE.

MICHAEL A. PASCALE, OF NEW YORK, N. Y.

MILK-BOTTLE HOLDER.

1,360,786.            Specification of Letters Patent.        Patented Nov. 30, 1920.

Application filed March 13, 1920. Serial No. 365,513.

*To all whom it may concern:*

Be it known that I, MICHAEL A. PASCALE, a citizen of the United States, and a resident of the city of New York, borough of Manhattan, in the county of New York and State of New York, have invented a new and Improved Milk-Bottle Holder, of which the following is a full, clear, and exact description.

This invention relates to improvements in milk bottle holders, an object of the invention being to provide a milk bottle holder which is adapted to be secured to a door or other support, which will readily admit the milk bottle, and which, when the milk bottle is in the holder, will operate to securely lock the holder in its closed formation and prevent removal of the bottle by unauthorized persons.

A further object is to provide a bottle holder of the character stated which can be manufactured and sold at an extremely low price and which will most efficiently perform the functions for which it is intended.

With these and other objects in view the invention consists in certain novel features of construction and combinations and arrangements of parts as will be more fully hereinafter described and pointed out in the claims.

In the accompanying drawings—

Figure 1:
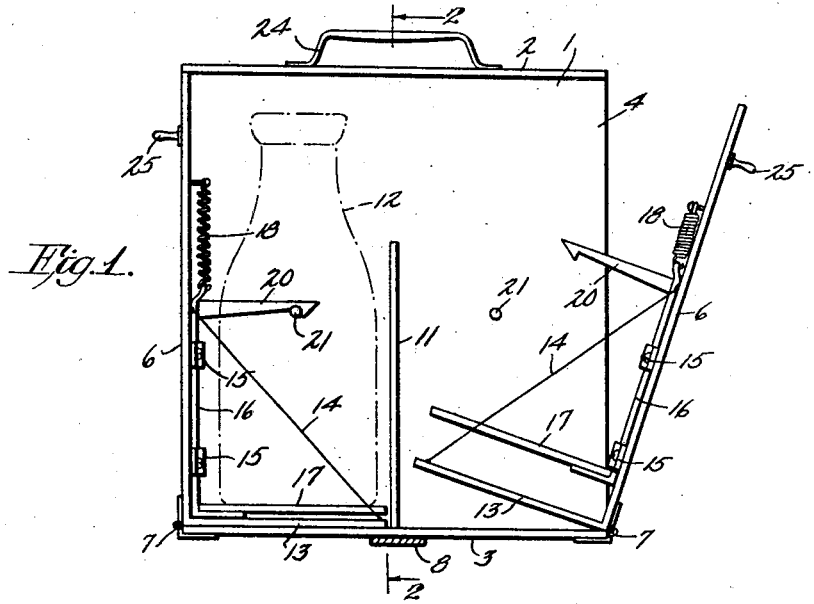
Figure 1 is a view in elevation showing the position of parts when one bottle is in the holder.
Figure 2:
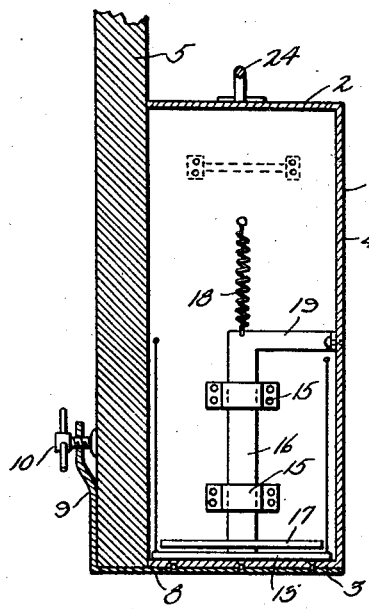
Fig. 2 is a view in section on the line 2—2 of Fig. 1.

Referring particularly to Figs. 1 and 2, 1 represents a rectangular casing which consists of a top 2, a bottom 3, and a front wall 4, the ends and rear of the casing being open. The rear of the casing is closed by the door 5 or other support to which it is attached, and the ends of the casing are adapted to be closed by casing doors 6, 6, the latter connected by hinges 7 to the bottom 3.

An angle bracket 8 is fixed to the bottom 3 and has an upwardly projecting member 9 adapted to be located against the inner face of the door 5 and support a set screw 10, which, when the latter is jammed against the door, will securely hold the casing 1 against the outer face of the door. Hence, when the door 5 is closed, the casing cannot be removed, but when the door is in open position, the casing can be conveniently removed after the set screw 10 is loosened.

A vertical partition 11 extends upwardly from the bottom 3 and divides the casing into two compartments and also functions to prevent tipping or overturning of the bottle 12 indicated by the dot and dash lines in Fig. 1. The casing doors 6 at their lower ends are made with horizontal supports 13 located at right angles to the doors 6 and connected to the doors by braces 14. Guide brackets 15 are fixed to the inner faces of the casing doors 6 and in these guide brackets bars 16 are mounted to slide. Platforms 17 are fixed to the lower ends of the bars 16 and are adapted to receive the milk bottles thereon and coiled springs 18 connect the upper ends of the bars 16 with the doors 6 exerting a normal upward pull on the bars to hold the platforms 17 in elevated position. The bars 16 are made with lateral extensions 19 on which notched or toothed catches 20 are fixed. Headed pins 21 are secured to the outer wall 4 and project inwardly therefrom and are adapted to receive and hold the catches 20 against movement when the bottles are in the casing.

Figure 3:
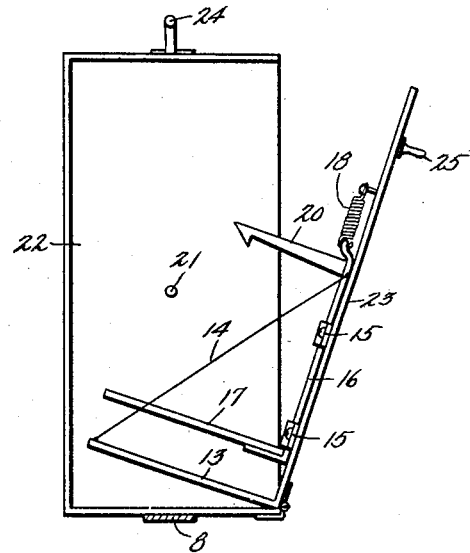
Fig. 3 is a view illustrating a modification.

Fig. 3 illustrates a modification of my invention which constitutes a casing 22 for a single milk bottle having a single door 23 corresponding to one of the doors 6. In other respects the structure is precisely like the preferred form and I have used the same reference letters to indicate like parts in both forms of my invention. A handle 24 is preferably provided at the top of the holder and handles 25 are provided on the casing doors to facilitate the manipulation of the device.

The operation is as follows: The holder is secured to the door 5 when the latter is open, and after the door is closed, the holder cannot be removed. When no weight is upon the platforms 17, the springs 18 operate to maintain the platforms and the catches 20 in elevated position so that even if the doors 6 are closed, they will not be locked in closed position because the catches 20 cannot engage the pins 21. When a milk bottle 12 is located on one of the platforms 17, the weight thereof will cause the platform 17 to be depressed against the action of the spring 18, hence moving the catch 20 downwardly so that when the door 6 is closed, the catch will engage the pin 21 and lock the door in closed position. After the doors are once locked by the weight of the bottles, they cannot be opened until the casing or holder is removed from the door 5, and this cannot be accomplished until the door 5 is in open position, hence preventing theft of the bottles.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A bottle holder, comprising a casing, a door hinged to the casing, a support fixed to the lower end of the door and at right angles thereto, bearing brackets on the inner face of the door, a bar mounted to slide in the bearing brackets, a spring connecting the upper end of the bar with the door, a bottle supporting platform on the bar normally elevated above the support, a catch fixed to the bar, and a pin fixed to the inner face of the casing and adapted to be engaged by the catch when the weight of a bottle on the platform moves said catch in position to engage the pin.

2. A bottle holder, comprising a casing open at its rear and ends, an angle bracket fixed to the casing and adapted to hold the casing with its open rear face against a door, a set screw in the bracket clamping the casing to the door, a pair of casing doors hingedly connected to the casing and adapted to close the ends of the latter, movable platforms carried by said casing doors and adapted to receive milk bottles thereon, and catches connected to the platforms and moved by the weight of bottles on the platforms into operative position.

3. A bottle holder, comprising a casing, a door hinged at its lower end in the casing, a platform extending at right angles to the door, a catch projecting at a substantial right angle to the door, a bar rigidly connecting the catch and the platform, means on the door guiding the movement of the bar, a device in the casing adapted to be engaged by the catch when the platform, bar and catch are depressed by the weight of a bottle thereon and the door closed, and a spring normally holding the catch, bar and platform in an elevated position, the action of said spring being overcome by the weight of the bottle on the platform.

MICHAEL A. PASCALE.